US009427110B2

(12) United States Patent
Hoare et al.

(10) Patent No.: US 9,427,110 B2
(45) Date of Patent: Aug. 30, 2016

(54) CONICAL BURR GRINDER (75) Inventors: Richard Hoare, Lane Cove (AU);
David Davenport, Lane Cove (AU);
Con Psarologos, Bardwell Valley (AU)

(73) Assignee: Breville Pty Limited, Alexandria, NSW (AU)

( * ) Notice: Subject to any disclaimer, the term of this patent is extended or adjusted under 35 U.S.C. 154(b) by 632 days.

(21) Appl. No.: 13/583,929

(22) PCT Filed: Mar. 11, 2011

(86) PCT No.: PCT/AU2011/000274
§ 371 (c)(1),
(2), (4) Date: Sep. 11, 2012

(87) PCT Pub. No.: WO2011/109873
PCT Pub. Date: Sep. 15, 2011

(65) Prior Publication Data
US 2013/0001339 A1 Jan. 3, 2013

(30) Foreign Application Priority Data

Mar. 12, 2010 (AU) .................................. 2010901024

(51) Int. Cl.
*A47J 42/08* (2006.01)
*A47J 42/40* (2006.01)
*A47J 42/44* (2006.01)
*A47J 42/50* (2006.01)

(52) U.S. Cl.
CPC .................. *A47J 42/08* (2013.01); *A47J 42/40* (2013.01); *A47J 42/44* (2013.01); *A47J 42/50* (2013.01)

(58) Field of Classification Search
CPC ......... B02C 2/10; B02C 7/175; B02C 19/22; B02C 7/08; B02C 7/184; B02C 7/12; B02C 7/06; B02C 18/0007; B02C 2018/0046; B02C 2018/0015; B01F 7/00816; B01F 2005/0005; B01F 13/0035; B01F 13/004; B01F 2215/0008; D21D 1/22; D21D 1/306; D21D 1/30; D21D 1/303; A01F 29/005; A47J 42/18; A47J 42/06; A47J 42/40; A47J 31/42; A47J 44/00; A47J 42/00; A47J 42/02; A47J 42/44; F25C 5/046
USPC ........ 241/260, 260.1, 261.2, 100, 259, 59.1, 241/33, 101.3
See application file for complete search history.

(56) References Cited

U.S. PATENT DOCUMENTS

| 4,787,299 | A | | 11/1988 | Levi et al. | |
|---|---|---|---|---|---|
| 5,463,932 | A | | 11/1995 | Olson | |
| 5,542,342 | A | | 8/1996 | McNeill et al. | |
| 5,645,230 | A | * | 7/1997 | Marogna et al. ....... | A47J 31/42 241/100 |
| 5,718,163 | A | | 2/1998 | Termini | |

(Continued)

FOREIGN PATENT DOCUMENTS

WO WO 2010085850 A1 * 8/2010 .............. A47J 31/42

*Primary Examiner* — Faye Francis
(74) *Attorney, Agent, or Firm* — Molins & Co. Pty. Ltd.

(57) ABSTRACT

An apparatus for grinding coffee. The apparatus including: a grinder mechanism; a ground discharge region; a user control for enabling a user to select grind preferences; a display element for displaying data indicative of user inputs to the user control; a processor element coupled to the user control and a display element for controlling operation of the grinder mechanism. The apparatus being adapted to provides fine control over grind size and dispense discreet doses according to a users preference and control inputs; and display depictions representing a range of coffee grinder functions.

19 Claims, 11 Drawing Sheets

(56) References Cited

U.S. PATENT DOCUMENTS

| | | | |
|---|---|---|---|
| 6,725,889 B2* | 4/2004 | Perez Vales | A47F 1/035 |
| | | | 141/104 |
| 7,874,505 B1* | 1/2011 | Lassota | A47J 42/38 |
| | | | 241/259.1 |
| 2005/0087074 A1* | 4/2005 | Lin | A47J 31/56 |
| | | | 99/279 |
| 2006/0037481 A1* | 2/2006 | Bicht | A47J 31/545 |
| | | | 99/279 |
| 2007/0068393 A1 | 3/2007 | Nosler et al. | |
| 2007/0187534 A1* | 8/2007 | Anson | A47J 42/18 |
| | | | 241/92 |
| 2011/0283889 A1* | 11/2011 | Con et al. | A47J 31/42 |
| | | | 99/286 |

* cited by examiner

Percolator Unit(s)

| | | Dose Select | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Dose Adjust | -5 | nn.n | nn.n | nn.n | nn.n | nn.n | nn.n | nn.n | nn.n | nn.n | nn.n | nn.n | nn.n |
| | -4 | nn.n | nn.n | nn.n | nn.n | nn.n | nn.n | nn.n | nn.n | nn.n | nn.n | nn.n | nn.n |
| | -3 | nn.n | nn.n | nn.n | nn.n | nn.n | nn.n | nn.n | nn.n | nn.n | nn.n | nn.n | nn.n |
| | -2 | nn.n | nn.n | nn.n | nn.n | nn.n | nn.n | nn.n | nn.n | nn.n | nn.n | nn.n | nn.n |
| | -1 | nn.n | nn.n | nn.n | nn.n | nn.n | nn.n | nn.n | nn.n | nn.n | nn.n | nn.n | nn.n |
| | 0 | nn.n | nn.n | nn.n | nn.n | nn.n | nn.n | nn.n | nn.n | nn.n | nn.n | nn.n | nn.n |
| | +1 | nn.n | nn.n | nn.n | nn.n | nn.n | nn.n | nn.n | nn.n | nn.n | nn.n | nn.n | nn.n |
| | +2 | nn.n | nn.n | nn.n | nn.n | nn.n | nn.n | nn.n | nn.n | nn.n | nn.n | nn.n | nn.n |
| | +3 | nn.n | nn.n | nn.n | nn.n | nn.n | nn.n | nn.n | nn.n | nn.n | nn.n | nn.n | nn.n |
| | +4 | nn.n | nn.n | nn.n | nn.n | nn.n | nn.n | nn.n | nn.n | nn.n | nn.n | nn.n | nn.n |
| | +5 | nn.n | nn.n | nn.n | nn.n | nn.n | nn.n | nn.n | nn.n | nn.n | nn.n | nn.n | nn.n |
| | 0 | nn.n | nn.n | nn.n | nn.n | nn.n | nn.n | nn.n | nn.n | nn.n | nn.n | nn.n | nn.n |
| Ave. rate | | nn.n | nn.n | nn.n | nn.n | nn.n | nn.n | nn.n | nn.n | nn.n | nn.n | nn.n | nn.n |

Filter Unit(s)

| | | Dose Select | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Dose Adjust | -5 | nn.n | nn.n | nn.n | nn.n | nn.n | nn.n | nn.n | nn.n | nn.n | nn.n | nn.n | nn.n |
| | -4 | nn.n | nn.n | nn.n | nn.n | nn.n | nn.n | nn.n | nn.n | nn.n | nn.n | nn.n | nn.n |
| | -3 | nn.n | nn.n | nn.n | nn.n | nn.n | nn.n | nn.n | nn.n | nn.n | nn.n | nn.n | nn.n |
| | -2 | nn.n | nn.n | nn.n | nn.n | nn.n | nn.n | nn.n | nn.n | nn.n | nn.n | nn.n | nn.n |
| | -1 | nn.n | nn.n | nn.n | nn.n | nn.n | nn.n | nn.n | nn.n | nn.n | nn.n | nn.n | nn.n |
| | 0 | nn.n | nn.n | nn.n | nn.n | nn.n | nn.n | nn.n | nn.n | nn.n | nn.n | nn.n | nn.n |
| | +1 | nn.n | nn.n | nn.n | nn.n | nn.n | nn.n | nn.n | nn.n | nn.n | nn.n | nn.n | nn.n |
| | +2 | nn.n | nn.n | nn.n | nn.n | nn.n | nn.n | nn.n | nn.n | nn.n | nn.n | nn.n | nn.n |
| | +3 | nn.n | nn.n | nn.n | nn.n | nn.n | nn.n | nn.n | nn.n | nn.n | nn.n | nn.n | nn.n |
| | +4 | nn.n | nn.n | nn.n | nn.n | nn.n | nn.n | nn.n | nn.n | nn.n | nn.n | nn.n | nn.n |
| | +5 | nn.n | nn.n | nn.n | nn.n | nn.n | nn.n | nn.n | nn.n | nn.n | nn.n | nn.n | nn.n |
| | 0 | nn.n | nn.n | nn.n | nn.n | nn.n | nn.n | nn.n | nn.n | nn.n | nn.n | nn.n | nn.n |
| Ave. rate | | n.nn | n.nn | n.nn | n.nn | n.nn | n.nn | n.nn | n.nn | n.nn | n.nn | n.nn | n.nn |

| Press Unit (s) | | Dose Select ||||||||||||
|---|---|---|---|---|---|---|---|---|---|---|---|---|---|
| | | 1 | 2 | 3 | 4 | 5 | 6 | 7 | 8 | 9 | 10 | 11 | 12 |
| Dose Adjust | -5 | nn.n | nn.n | nn.n | nn.n | nn.n | nn.n | nn.n | nn.n | nn.n | nn.n | nn.n | nn.n |
| | -4 | nn.n | nn.n | nn.n | nn.n | nn.n | nn.n | nn.n | nn.n | nn.n | nn.n | nn.n | nn.n |
| | -3 | nn.n | nn.n | nn.n | nn.n | nn.n | nn.n | nn.n | nn.n | nn.n | nn.n | nn.n | nn.n |
| | -2 | nn.n | nn.n | nn.n | nn.n | nn.n | nn.n | nn.n | nn.n | nn.n | nn.n | nn.n | nn.n |
| | -1 | nn.n | nn.n | nn.n | nn.n | nn.n | nn.n | nn.n | nn.n | nn.n | nn.n | nn.n | nn.n |
| | 0 | nn.n | nn.n | nn.n | nn.n | nn.n | nn.n | nn.n | nn.n | nn.n | nn.n | nn.n | nn.n |
| | +1 | nn.n | nn.n | nn.n | nn.n | nn.n | nn.n | nn.n | nn.n | nn.n | nn.n | nn.n | nn.n |
| | +2 | nn.n | nn.n | nn.n | nn.n | nn.n | nn.n | nn.n | nn.n | nn.n | nn.n | nn.n | nn.n |
| | +3 | nn.n | nn.n | nn.n | nn.n | nn.n | nn.n | nn.n | nn.n | nn.n | nn.n | nn.n | nn.n |
| | +4 | nn.n | nn.n | nn.n | nn.n | nn.n | nn.n | nn.n | nn.n | nn.n | nn.n | nn.n | nn.n |
| | +5 | nn.n | nn.n | nn.n | nn.n | nn.n | nn.n | nn.n | nn.n | nn.n | nn.n | nn.n | nn.n |

| 0 | nn.n | nn.n | nn.n | nn.n | nn.n | nn.n | nn.n | nn.n | nn.n | nn.n | nn.n | nn.n |
|---|---|---|---|---|---|---|---|---|---|---|---|---|
| Ave. rate | n.nn | n.nn | n.nn | n.nn | n.nn | n.nn | n.nn | n.nn | n.nn | n.nn | n.nn | n.nn |

FIG. 8F

CONICAL BURR GRINDER

FIELD OF THE INVENTION

The invention relates to coffee grinders and more particularly to an electric coffee grinders.

The invention has been developed primarily as an electric coffee grinder with an electronic display and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Many types of coffee grinder are known. Coffee drinkers require different grinds for different purposes. In order of increasing grind size, coffee drinkers require ground coffee for espresso, percolators, drip filters machines and French presses. Conventionally, the portafilter of an espresso machine will hold one or two doses of ground coffee and the machine it fits into will subsequently dispense one or two shots of espresso.

Users of percolators, drip filters machines or French presses require fresh grounds in quantities enough for as few as one and up to a dozen cups of brewed coffee. Some users will like their freshly ground coffee dispensed into a portafilter. Other users will like their fresh ground coffee dispensed into a coffee filter or into a storage container. Accordingly, different users, even within a single household will require a variety of coffee grinds, in a variety of quantities, dispensed into a variety of containers.

Embodiments of the present invention addresses these various needs.

OBJECTS OF THE INVENTION

It is an object of the present invention to overcome or ameliorate at least one of the disadvantages of the prior art, or to provide a useful alternative.

It is an object of the invention in a preferred form to provide a versatile coffee grinder having a display that is appropriate to a versatile coffee grinding machine.

It is another object of the invention in a preferred form to provide an electric coffee grinder that can dispense discreet doses according to a user's preference and control inputs.

It is another object of the invention in a preferred form to provide a display having depictions that represent a range of coffee grinder functions.

It is another object of the invention in a preferred form to provide a coffee grinder that can detect the presence of a portafilter and adjusts its display accordingly.

It is another object of the invention in a preferred form to provide an electric coffee grinder that provides fine control over grind size and has a display that can provide graphic user feedback with regard to grind size and ground coffee discharge quantity.

SUMMARY OF THE INVENTION

According to an aspect of the invention there is provided an apparatus for grinding coffee, the apparatus including:
a grinder mechanism;
a ground discharge region;
a user control for enabling a user to select grind preferences;
a display element for displaying data indicative of user inputs to the user control;
a processor element coupled to the user control and display element for controlling operation of the grinder mechanism.

Preferably, the apparatus is adapted to dispense a discreet quantity of grounds according to the user inputs to the user control. More preferably, the display having depictions that represent a range of grinder functions.

Preferably, the apparatus further including a sensor element coupled to the processor element for detecting presence of a container placed in the ground discharge region. More preferably, the apparatus further including a sensor element coupled to the processor element for detecting presence of a cradle placed in the ground discharge region.

Preferably, the ground discharge region is adapted to receive a container type selected from the set comprising: a portafilter, a filter or a storage canister. More preferably, the ground discharge region is adapted to receive a cradle.

Preferably, the processor element can determine a container type placed in the ground discharge region, and adjust the display element accordingly. More preferably, the processor element can determine presence of a cradle in the ground discharge region, and adjust the display element accordingly.

Preferably, the grinder mechanism is adjustable to provide fine control over grind size; and the display element being adapted to provide graphic user feedback with regard to grind size and ground discharge quantity.

Preferably, the user control enables the user to select grind preferences, including any one or more of the following: grind quantity; and grind size; and the processor element, and determines a corresponding grind time setting.

Preferably, the processor element interrogates one or more look up table to determine a grind time setting. More preferably, the processor element receives a user selected dose adjustment data for fine-tuning dose quality.

Preferably, grind quantity is displayed in 'shots' when an espresso grind size is selected or 'cups' when a percolator or filter grind size is selected.

Preferably, the grinder mechanism is the motorised burr grinder. More preferably, the grinder mechanism is the motorised burr grinder including a motor driven lower burr and an upper burr; and an upper burr carriage being axially movable with respect of the lower burr for adjusting grind size. A driven gear preferably has an internal bore with fine threads that engage and cooperate with fine threads circumferentially located on the outside surface the upper burr carriage; and wherein the upper burr carriage is restrained from rotation and thus axially translates either up or down according to rotation of the driven gear, thereby moving the lower burr with respect to the upper burr for adjusting grind size. The driven gear preferably further comprises an external gear ring with radially oriented gear teeth for engaging a pinion gear that drives a multi-turn potentiometer for enabling the processor element to monitor degree of rotation of the pinion gear, which is translated into a visual indication on the display element.

Preferably, the apparatus further including a hopper for feeding grounds to the grinder mechanism.

According to an aspect of the invention there is provided a versatile coffee grinder having a display that is appropriate to a versatile coffee grinding machine.

According to an aspect of the invention there is provided an electric coffee grinder that can dispense discreet doses according to a user's preference and control inputs.

According to an aspect of the invention there is provided a display having depictions that represent a range of coffee grinder functions.

According to an aspect of the invention there is provided a coffee grinder that can detect the presence of a portafilter and adjusts its display accordingly.

According to an aspect of the invention there is provided a coffee grinder that can detect the presence of a cradle and adjusts its display accordingly.

According to an aspect of the invention there is provided an electric coffee grinder that provides fine control over grind size and has a display that can provide graphic user feedback with regard to grind size and ground coffee discharge quantity.

BRIEF DESCRIPTION OF THE DRAWING FIGURES

In order that the invention be better understood, the following drawing figures are provided in which.

BEST MODE AND OTHER EMBODIMENTS

Figure 1:
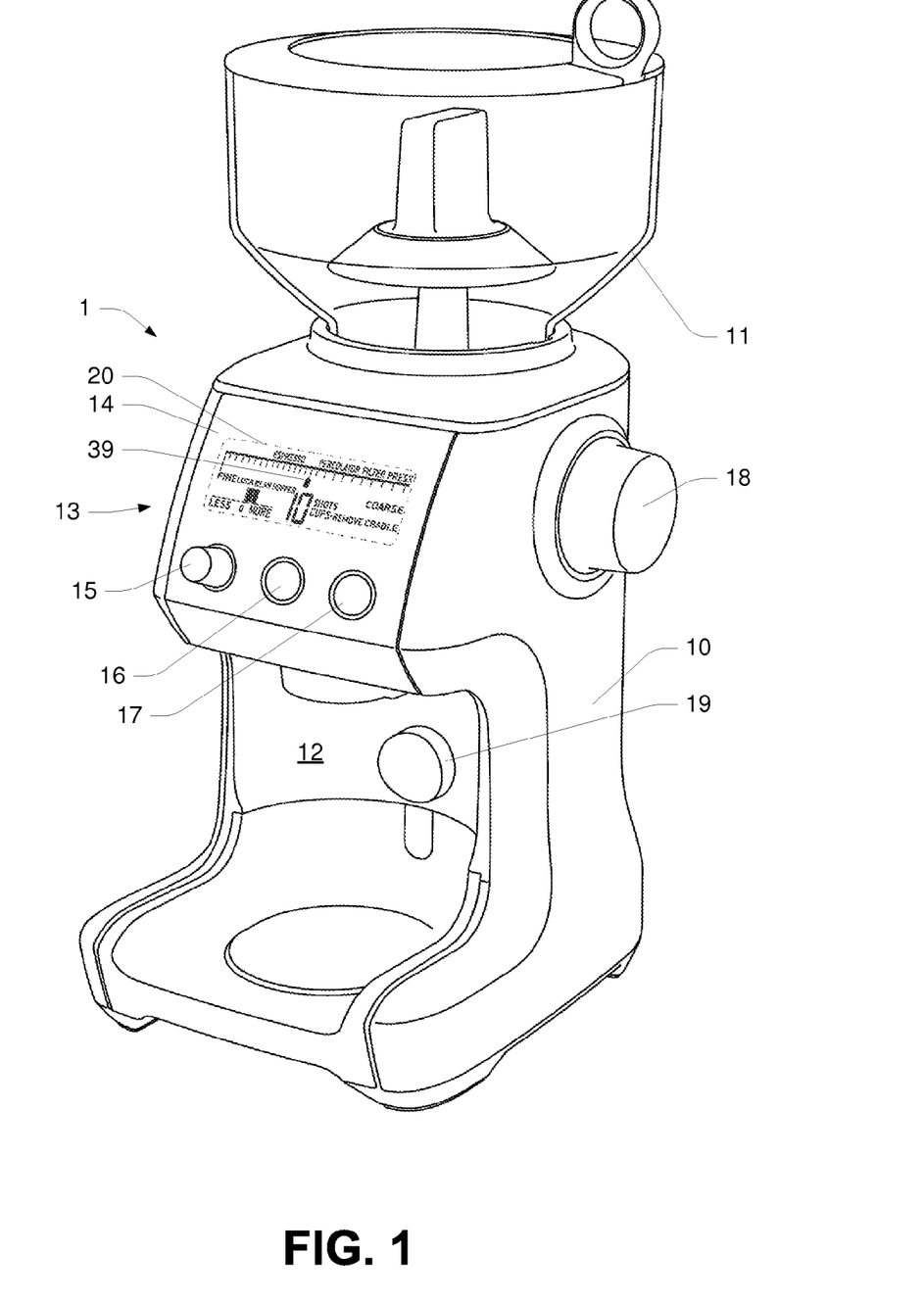
FIG. 1 is a perspective view of a motorised coffee grinder with electronic display.

As shown in FIG. 1, an electrical, motorised coffee grinder 1 comprises a base 10 and its hopper 11. The base 10 has a recess or discharge area 12 into which ground coffee is dispensed. The discharge area can accommodate containers such as a portafilter, filter or storage canister. The base 10 has a head 13 located above the recess 12. A front panel or surface 14 of the head 13 features various user controls including (as will be further explained) a discharge amount adjustment rotating knob 15, a push button or other user control for choosing discreet preset discharge amounts 16, a start/cancel button 17 and a grind size selector dial 18. The grind size selector dial mechanically controls the vertical movement of the upper burr of the grinder. The spacing between the upper burr and the lower burr determines the grind size. The dial 18 also controls the appearance of the display 20 by causing one of a number of arrow icons to appear in the appropriate position under a grind size index line 21 (see FIG. 2). The preset amount button 16 allows the user to choose an amount of coffee grinds to discharge. Depressing this button causes the numeric display portion 33 to change in discrete increments. Each displayed numeric value represents a grinding time for each grind type. As will be explained, grinding time and grinding type are related to the discharge amount in accordance with a look up table as will be explained. A rear surface of the recess 12 also has an external button 19 coupled to an electrical switch that is activated with the presence of a portafilter. The front panel 14 also features an electronic display 20.

Figure 2:
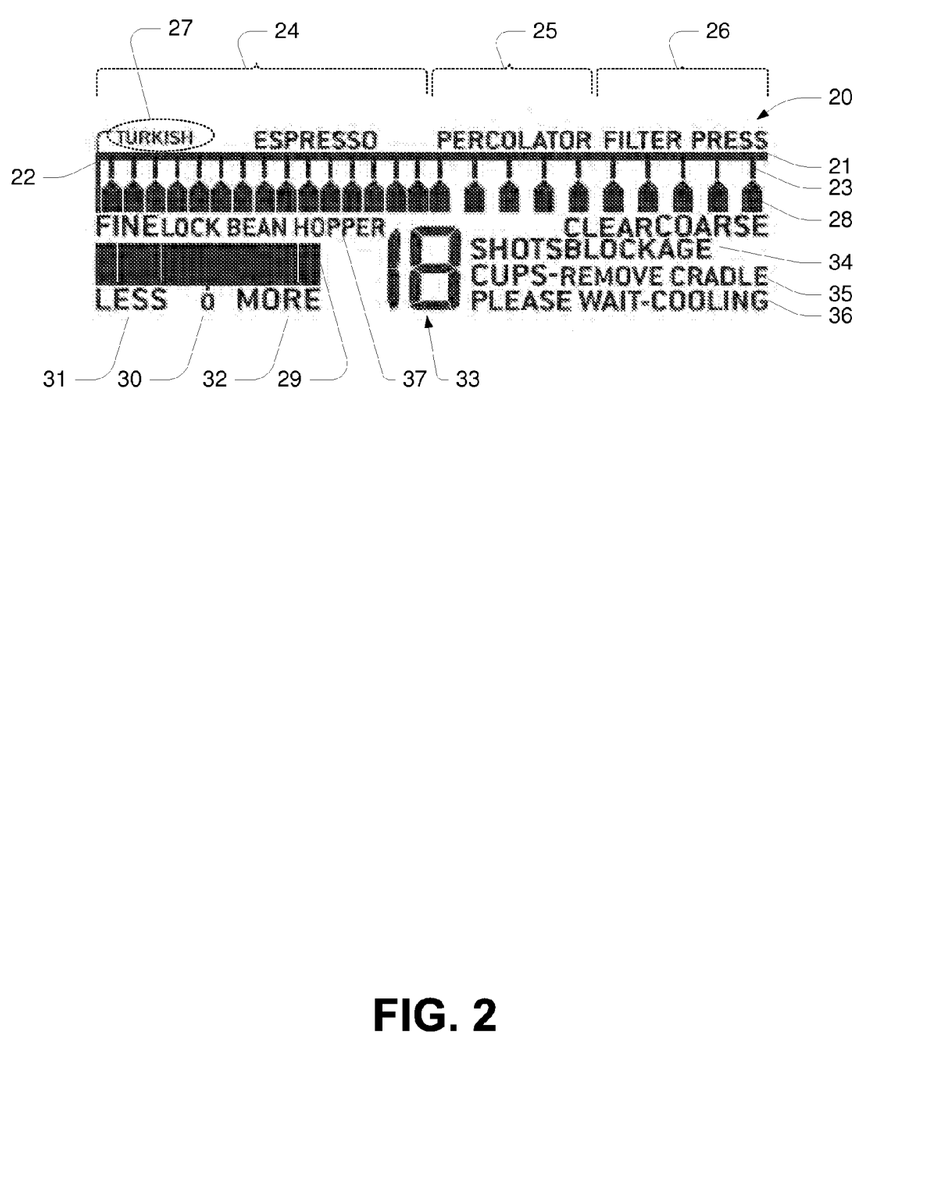
FIG. 2 is a schematic presentation of an electronic display for a coffee grinder with all display icons activated.
Figure 3A:
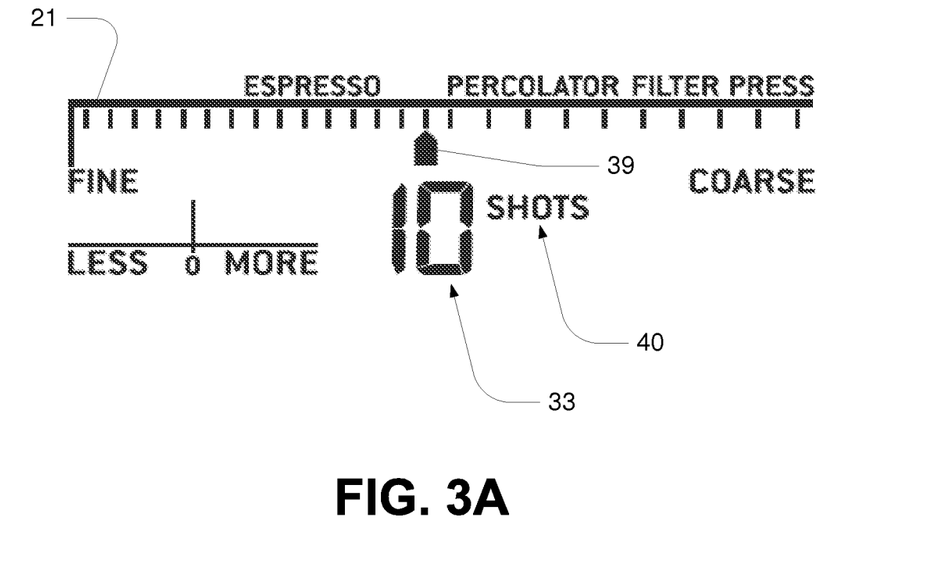
FIGS. 3(a)-3(d) are schematic illustrations of an electronic display illustrating a variety of display characteristics.
Figure 3B:
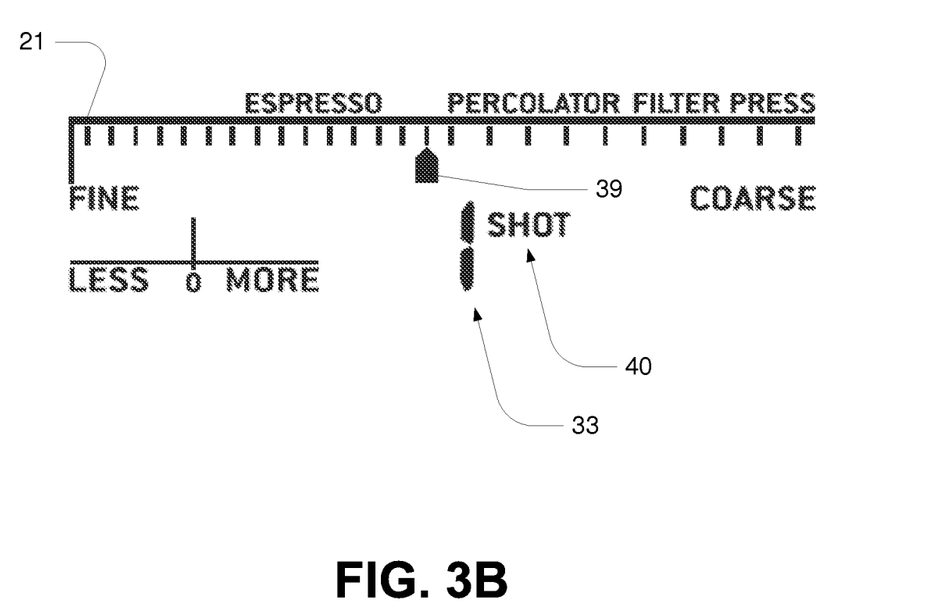
Figure 3C:
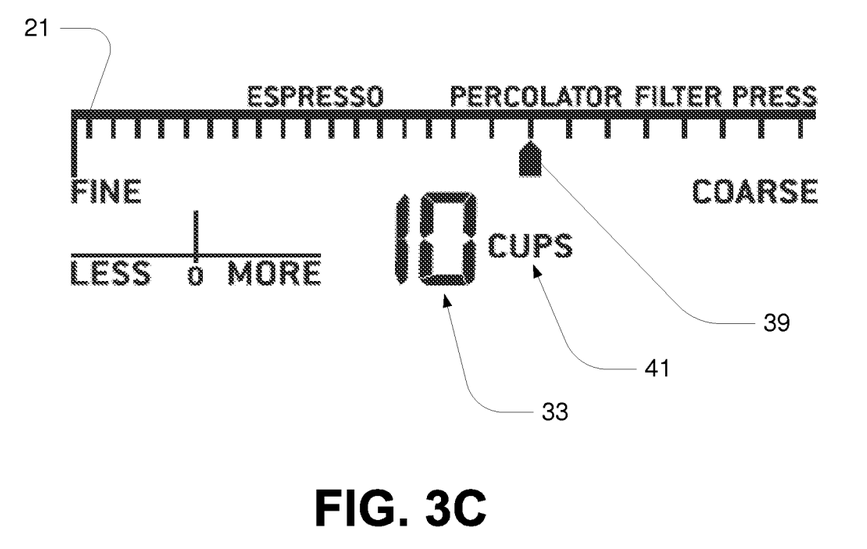
Figure 3D:
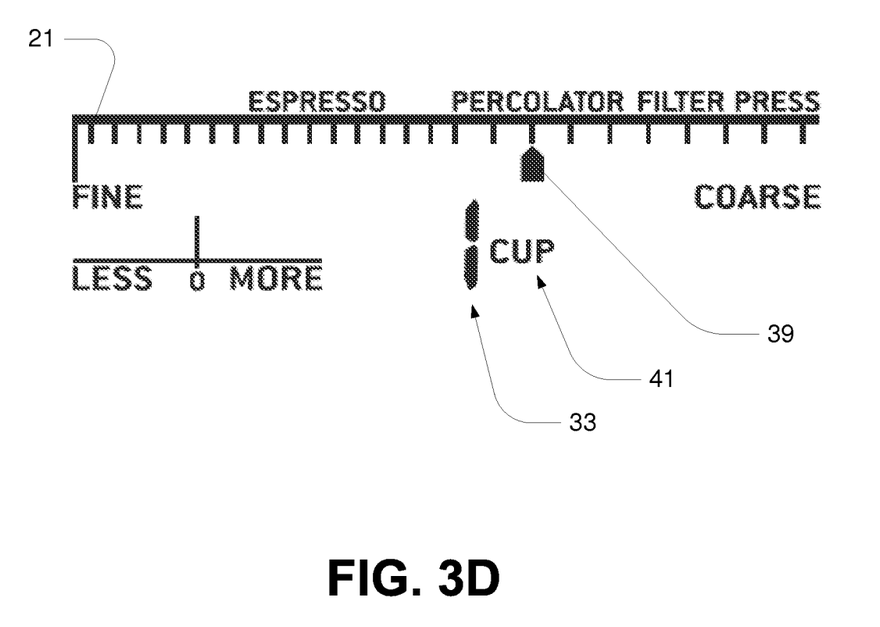

As shown in FIG. 2, the microprocessor driven electronic display 20 is adapted to display a variety of user selected options as well as alerts and information regarding the state of the grinder. In this example, and upper portion of the display 20 comprises a grind size index line 21 with index marks 23. As suggested by FIG. 2, the index line represents a range of grind sizes ranging from the finest grind 22 (as might be used for fine espresso coffee) and increasing in discreet steps to an index mark 23 indicative of the coarsest grind, as might be used in a French press or plunger. The exact wording that appears on the display is not essential. Between these two extremes are a range of vertical index marks indicative of "normal" grind 24 used in an espresso machine, medium grinds 25 that might be used in a coffee percolator and coarse grinds 26 as might be used in a filter coffee machine or French press or plunger device. The directionality of the index line is not essential so long as one end represents coarsest and the other finest. Individual words 27 appear above or adjacent to the index line to provide additional feedback to the user regarding the selected grind. Below the index line are a number of arrow icons 28, equal in number to the number of index marks 23. At any one time, only one arrow 28 is displayed. This arrow responds to the grind size selected by the user using the rotating knob 18. The words "fine" appear below the index line at the left hand side and the word "coarse" appears below the index line on the right hand side. Another graphic element 29 illustrates the fine adjustment to the selected dose (as input by the user) using the amount adjustment control 15. In this example, the graphic element 29 comprises a centre portion 30 corresponding to the nominal coffee dose delivery and graphic components 31, 32 located to either side of the centre line 30 indicating to what extent the user has trimmed or requested more or less discharge per dose. The display also includes two numeric characters 33 preferably located in the centre of the display 20. These numerals indicate the number of shots or cups that the user has requested using the preset selector button 16. The words "shot" or "shots" and "cup" or "cups" appears next to the numerals 33. The correct word is displayed according to the user influenced inputs to the microprocessor. The display is also adapted to provide information regarding malfunctions such as blockage of the coffee delivery pathway 34, the need to remove a portafilter holding cradle because it is not appropriate to the delivery grind or style 35 and an indication that the operation of the device has been temporarily halted by the micro processor because a thermal sensor has detected an overheating condition 36. A portion of the display also indicates when the bean hopper has not been locked on to the base and needs to be for the base to operate 37.

The index line and moving arrows shown in FIG. 2 provide an important user feedback regarding the operation of the coarseness adjustment knob 18. In order to obtain fine mechanical control over the position of the upper burr in the grinder, the mechanical action of the knob 18 is geared down considerably. In this way, it takes a number of turns to achieve what is, in effect, a very small vertical motion in the upper burr. This wide range of motion of the knob 18 is translated into a relatively small linear display by sensing the rotational movement of the knob 18 with a multi turn potentiometer. In this example, a ten turn potentiometer is used and the resistance imposed by the potentiometer is sensed by the microprocessor. The microprocessor interprets the action of the potentiometer and translates this as a visual depiction on a linear scale, being the relative position of the arrow 28 relative to the grind index line 21.

As shown in FIG. 3(*a*) though FIG. 3(*d*) rotation of the grind adjust knob 18 causes changes to occur on graphic display 20. With reference to FIG. 3(*a*) the arrow icon 39 is depicted as being at the coarse end of the espresso range of the index line 21. The central numeric icon 33 indicates that the user has selected to doses. Because the selected grind is an espresso grind, the "units" display 40 indicates "shots" (in the plural).

As shown in FIG. 3(*b*) the arrow icon 39 indicates that an espresso grind has been selected by the user, but in this example, the requested dose is "one" 33. Accordingly, the microprocessor causes the "unit" display 40 to show "shot" instead of "shots".

With reference to FIG. 3(*c*) and FIG. 3(*d*) these displays indicate dose quantity display in the range that extends from percolator grinds through to the coarsest grinds. In this range of grinds, the "unit" display 40 reads "cups" 41 when the unit display 33 is two or more. As seen in FIG. 3(*d*) the "unit display 41 shows "cup" when the unit 33 is 1. Thus, the needs of espresso drinkers that are requesting "shots" of espresso are met as well as the needs of non-espresso drinkers that are more accustomed to requesting coffee by the cup or cups.

Figure 4:
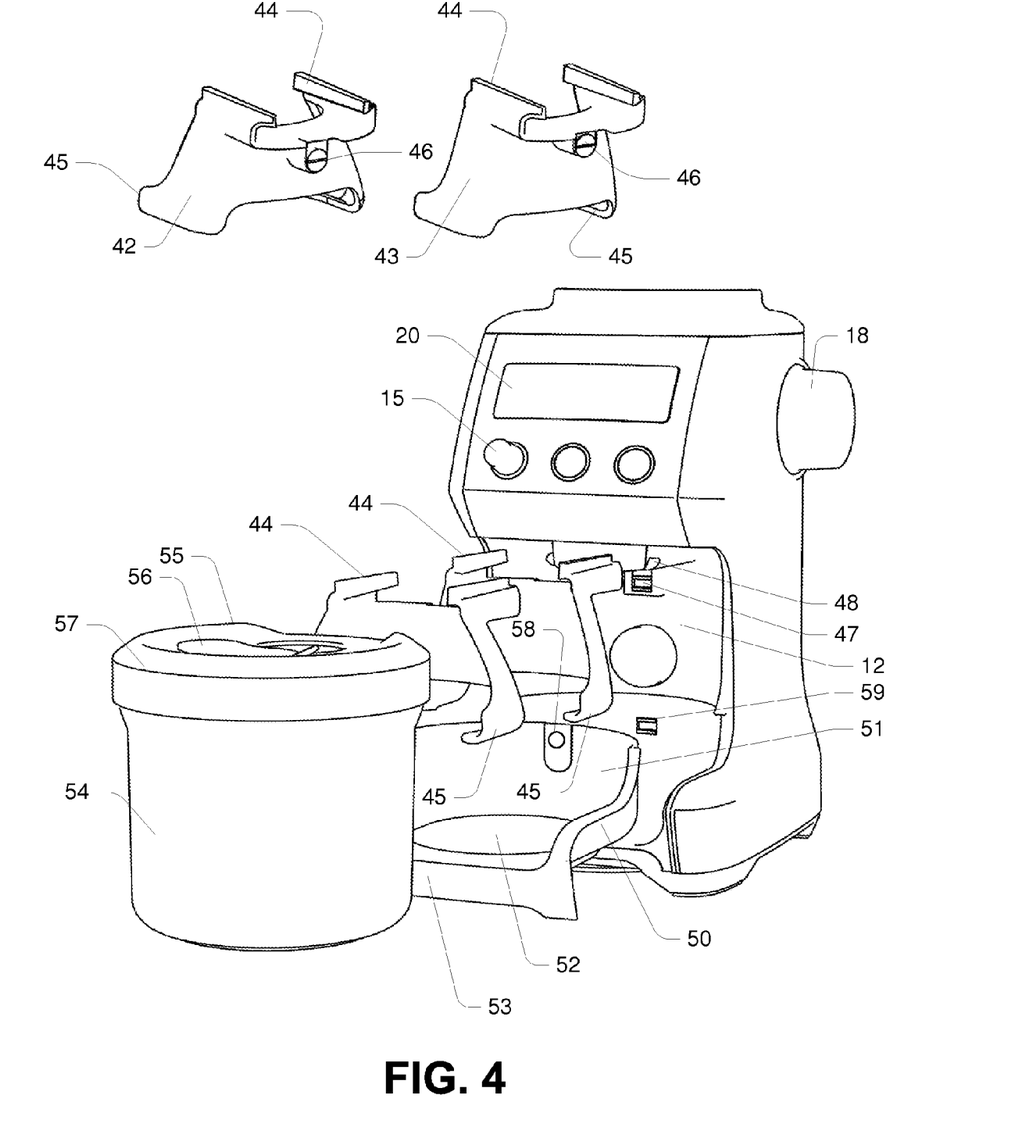
FIG. 4 is a perspective view of the coffee grinder of the present invention, also illustrating some of its accessories.

As shown in FIG. 4, the recessed or discharge area 12 is adapted to receive either one of two different portafilter cradles 42, 43 that are provided as accessories with the grinder of the present invention. One of the cradles 42 is adapted to receive a 50 mm and 54 mm size portafilters and the other 43 is adapted to receive a 58 mm size portafilter. The difference resides in the distance between the attachment (44) of each and the supporting rim 45 and also the distance the support arms are apart. Both cradles are provided with a steel target screw, plate or fixture 46 that is adapted to be located in position by and temporarily retained by a magnet 47 located on the back wall of the recess 12. A microswitch 48 is when tripped either of the cradles 42, 43 are mounted onto the grinder correctly. The activation of the microswitch is interpreted by the microprocessor and results in a change in the display and the functionality of the grinder. When a cradle is detected by the microprocessor because of the activation of the microswitch, the numeric display 33 will only display a "one shot" or "two shots" icon. This is because the only options are a one shot or two shot portafilter. The user can use the present switch 16 to select between one or two shots. When a cradle is present, the microprocessor will not allow the grinder to deliver more than two shots.

The recess 12 is also adapted to receive a removable drip tray 50. The drip tray is preferably a seamless injection moulded part comprising a semi-circular or other shaped splash back area 51 having a smooth interface to a floor area 52. The floor 52 transitions smoothly to a bib 53. The drip tray 50 is adapted to receive a storage canister 54 having a lid 55. The lid 55 features a removable polymeric bung or flap 56 that allows the canister to be loaded even when the full lid 57 is in place. The drip tray has a magnetic target 58 located on a rear surface that is retainable by a second magnet 59 located on a back wall of the recess 12. In preferred embodiments, the lid 57 is ferromagnetic and can therefore be temporarily retained by the upper magnet 47 while the container is being filled. A relatively close fit between the cylindrical surface of the container 54 and the splash back 51 mechanically stabilises the container as it is being filled.

In an embodiment, when the storage canister is located in place and the grinder is in a state identifying that a portafilter has not been engaged, the grinder can be adapted to deliver multiple shots. The number/count of shots of a particular nominal grind can be entered by the user, or a manual grind stop can be performed.

Figure 5:
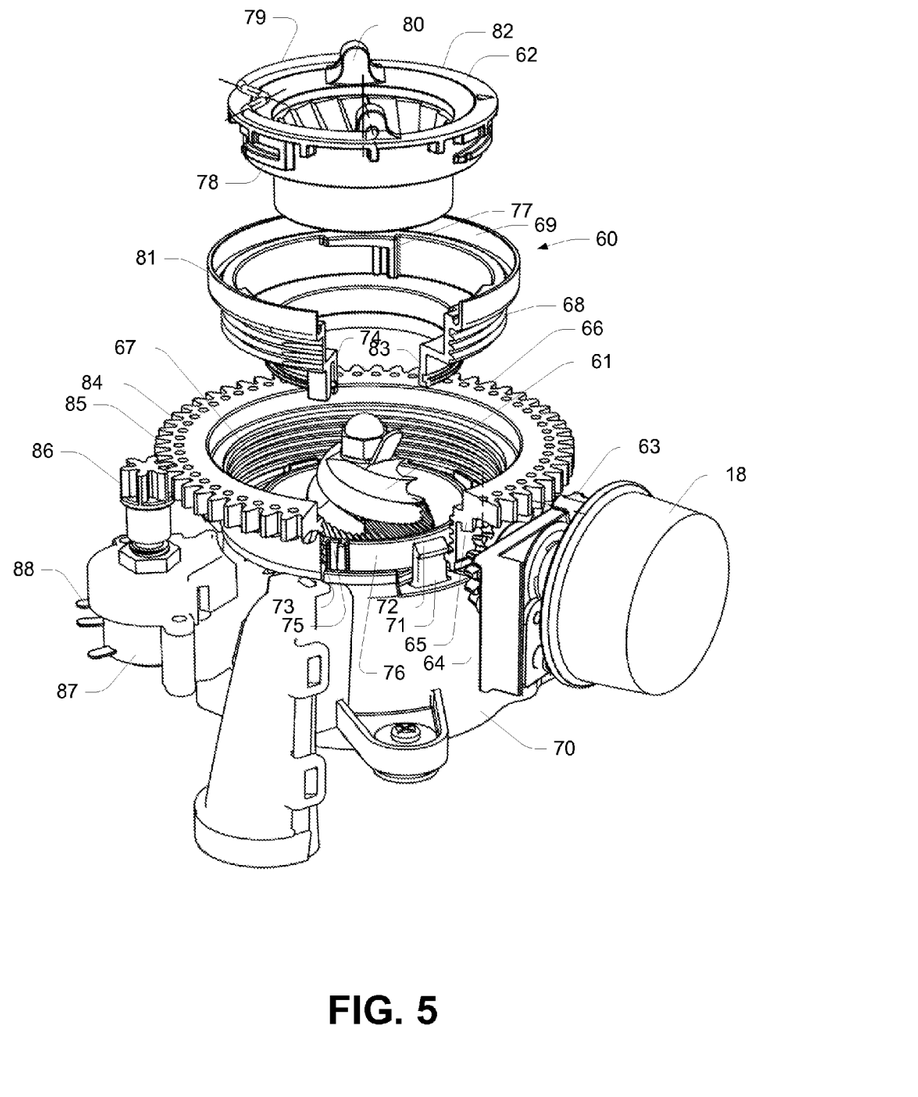
FIG. 5 is a perspective view of a burr grinder housing and discharge chute.

As shown in FIG. 5, the motorised burr grinder 60 comprises a motor driven lower burr 61 and an upper burr 62. In this example, the manual grind size adjustment knob 18 rotates. The gearbox 63 in turn rotates a drive gear 64 that acts on teeth 65 formed around the main opening of the main or driven gear 66. The driven gear 66 has an internal bore with fine threads 67 that engage and cooperate with fine threads 68 located on the outside surface of the upper burr holder or carriage 69. The rotating knob 18 is able to affect very fine rotational control over the driven gear 66. The driven gear is retained for rotational movement on the grinder housing 70 by a two or (preferably three) tabs 71 that are integral with the housing 70. Each tabs has a tooth 72 that engages a rim 73 that is circumferential and internal to the main gear 66. Thus, the main gear 66 can rotate but not translate axially. However, the upper burr carriage 69 is restrained from rotation and thus translates either up or down according to the rotation of the main gear 66. The carriage 69 has, in this example, a pair of vertically oriented jaws 74 that engage a web section 75 formed on a pilot rim that is part of the grinder housing and that surrounds the lower burr 61. The upper burr carriage 69 and the upper burr 62 are removably interconnected by male and female bayonet elements 77, 78 that allow the upper burr 62 to be rotated a fraction of a turn e.g. one third of a turn and thereby removed from or reinserted into the carriage 69. A generally "U" shaped handle 79 cooperates with a pair of ears 80 that protrude from an upper surface of the upper burr. Thus, regardless of the position that the upper burr carriage 69 is in, the upper burr itself can be easily removed and reinserted without altering its spacing from the lower burr 61. The carriage 69 further comprises an upper vertically oriented rim 81 for receiving the top flange 82 of the upper burr. The carriage 69 also comprises an intermediate portion with exterior fine threads 68 and a lower section of reduced diameter 83 that includes the jaws 74 and a lower pilot rim for engaging the grinder housing.

The main or driven gear 66 further comprises an external gear ring 84 with radially oriented gear teeth 85. The continuous ring formed by the teeth 85 engages with a pinion gear 86 that drives a ten turn potentiometer 87. The potentiometer outputs 88 are monitored by the grinder's microprocessor and the degree of rotation of the pinion gear 86 is translated into a visual indication on the display 20 that is indicative of the grind size and therefore directly indicative of the vertical separation between the lower burr 61 and the upper burr 62. The pinion 86 could also be attached to other forms of monitoring the extent of rotation of the main gear 66, including a gear mechanism for providing an analogue indication of the grind size.

Figure 6:
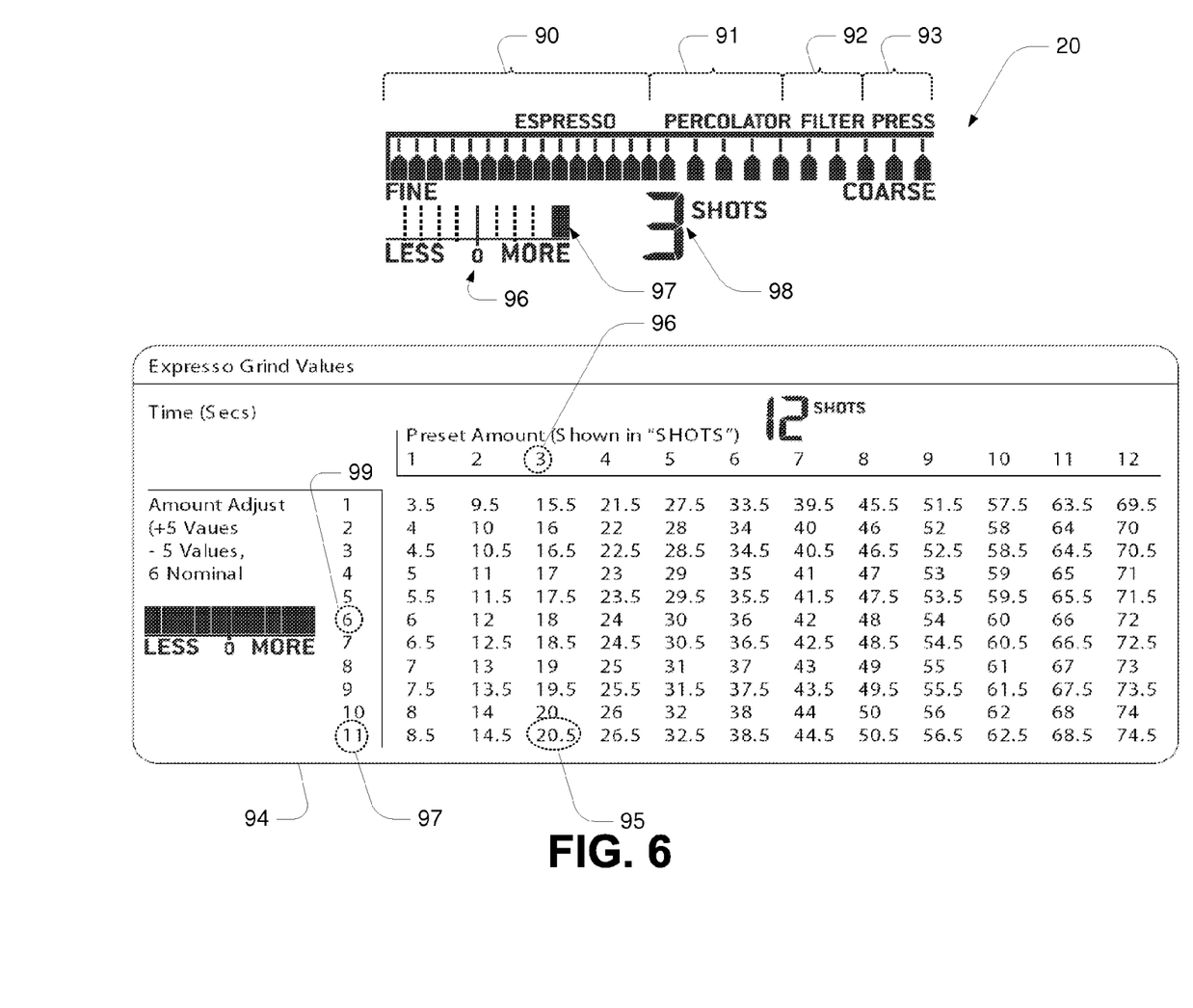
FIG. 6 is a schematic diagram illustrating a display and its relationship to a lock up table stored by a microprocessor.

FIG. 6 illustrates how the grinder's microprocessor determines the grind time for a given grind size. More particularly, a user can adjust the strength of the brew by increasing or decreasing the discharge amount using the discharge amount adjustment knob 15. As suggest by FIG. 6, the grind index line is broken down into a plurality of ranges (in this example being four): an espresso range 90, a percolator range 91, a filter coffee range 92 and a French press range 93. Each range is associated with a look up table 94 stored in the grinder's microprocessor. The look up table 94 graphically illustrated in FIG. 6 corresponds to the espresso range 90. The look up table contains stored values of time 95 that correspond to a given user requested dose 96 and a given user selected dose adjustment value 97. In the example of FIG. 6, the look up table contains 12 columns, each column corresponding to a particular user requested dose. As previously mentioned, the user requested dose 98 is depicted centrally on the display 20. In this example, the user has requested three shots of espresso. The look up table also stores eleven different values for each requested dose. These values are shown in column form in FIG. 6. Each of the eleven stored values in a particular column corresponds to an adjustment to the nominal grind time. In this example, the nominal grind time is given in row six 99. Thus it can be seen that the nominal grind time for three shots of espresso is 18 seconds. However, in this example, the user has selected the maximum strength, corresponding to row eleven 97. This results in a grind time of 20.5 seconds 95.

Figure 7:
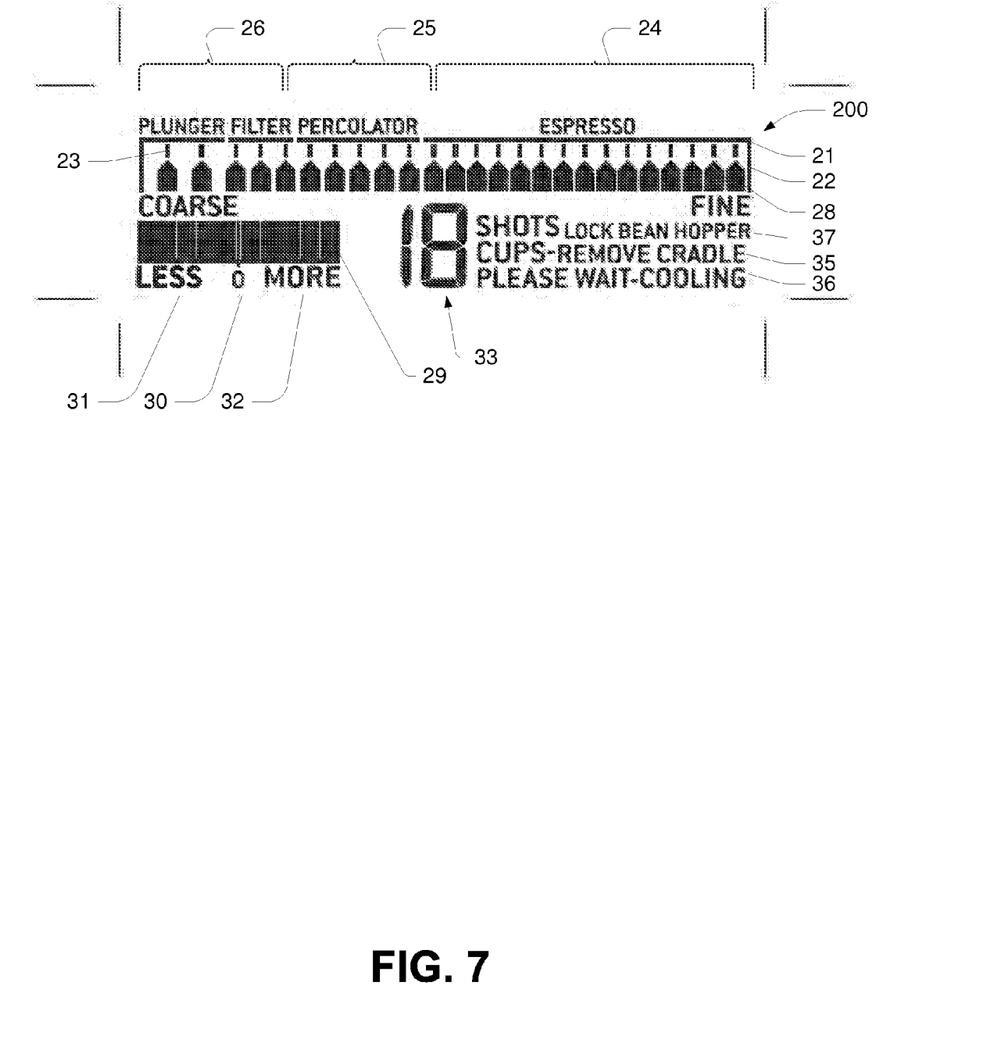
FIG. 7 is a schematic presentation of an electronic display for a coffee grinder with all display icons activated.

Referring to FIG. 7, it will be appreciated that the appearance of the display 200 (initially shown in FIG. 2) can comprise alternative forms.

Figure 8A:
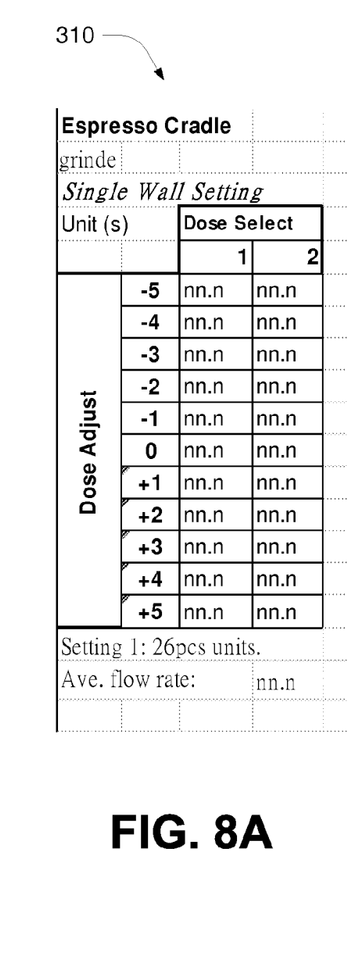
FIG. 8A though FIG. 8F are example tables representing grind time settings.
Figure 8B:
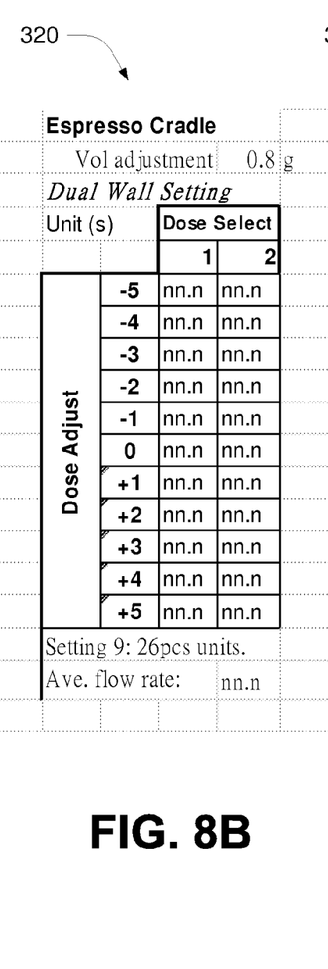
Figure 8C:
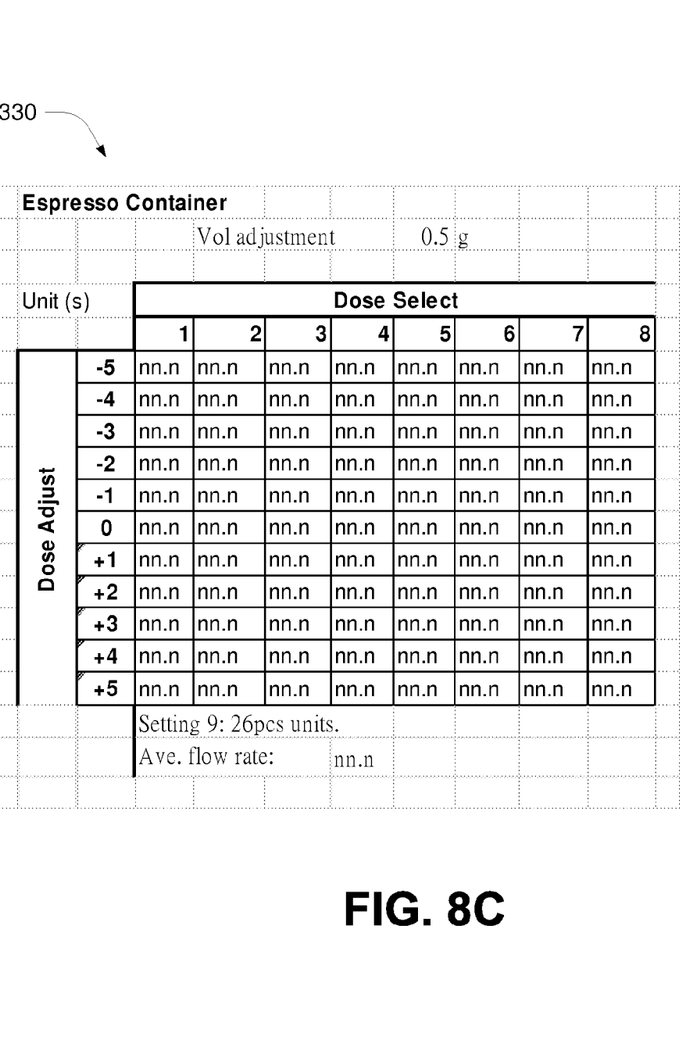
Figure 8F:
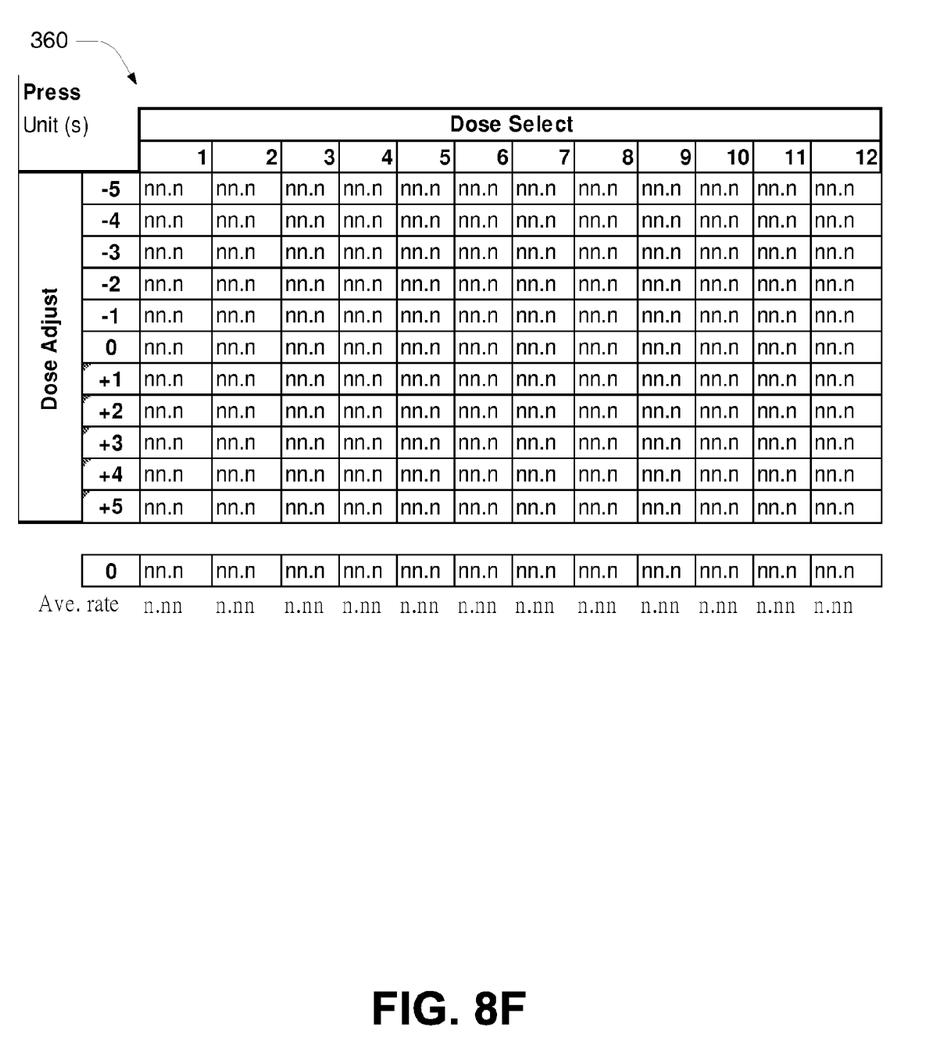

Referring to FIG. 8A though FIG. 8F, six independent matrix tables (310, 320, 330, 340, 350, 360) indicative of grind times can be maintained by the apparatus. In this example embodiment:

matrix tables (310, 320) can correspond to grind time ranges for espresso coffee ground being dispensed into the cradle;

matrix table (330) can correspond to grind time ranges for espresso coffee ground being dispensed into a storage canister;

matrix table (340) can correspond to grind time ranges for percolator coffee ground being dispensed;

matrix tables (350) can correspond to grind time ranges for filter coffee ground being dispensed;

matrix tables (360) can correspond to grind time ranges for press coffee ground being dispensed into percolator;

It will be appreciated that a coffee grinder apparatus can comprise data indicative of one or more matrix tables. For example, two matrix tables can correspond to ranges for dispensing espresso coffee grounds within the current unit, one matrix tables for dispensing espresso coffee grounds to a storage canister, single wall, dual wall, percolator, filter and press. There are independent matrix tables for each coffee grinding range, and it will be appreciated that more, or less, matrix tables can be embodied in the grinder apparatus.

It will be appreciated that the illustrated coffee grinder is any one or more of the following:

a versatile coffee grinder having a display that is appropriate to a versatile coffee grinding machine; and/or an electric coffee grinder that can dispensed discreet doses according to a user's preference and control inputs; and/or adapted to provide a display having depictions that represent a range of coffee grinder functions; and/or adapted to detect the presence of a portafilter and adjusts its display accordingly; and/or an electric coffee grinder that provides fine control over grind size and has a display that can provide graphic user feedback with regard to grind size and ground coffee discharge quantity.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. An apparatus for grinding coffee, the apparatus including:
   a grinder mechanism that is adjustable by a user to select a coffee grind size, and the grinder mechanism generates a signal indicative of a current selected coffee grind size;
   a ground discharge region;
   a user control for enabling a user to select grind preferences; the user control including both a dose selector for choosing one of a discreet pre-set grind discharge amounts, and a grind discharge amount adjustment selector;
   a display element for displaying data indicative of user inputs to the user control;
   a processor element coupled to the user control and display element, the processor element controls actuation of the grinder mechanism, the processor element receives the signal indicative of the current selected coffee grind size and causes an indication of the selected coffee grind size to be presented on the display element;
   wherein the processor element identifies a range of nominal grind duration settings based on the current selected coffee grind size and a user selected dose data from the dose selector;
   wherein the processor element uses a user selected dose adjustment data from the grind discharge amount adjustment selector to select a grind duration from the range of nominal grind duration settings;
   such that strength of a coffee brew is adjusted for the current selected coffee grind size and the selected user selected dose data; and
   wherein the display element depicts information indicative of each of: the current selected coffee grind size, the selected user selected dose data, and the user selected dose adjustment data.

2. The apparatus according to claim 1, wherein
   the apparatus is adapted to dispense a discreet quantity of grounds according to the user inputs to the user control.

3. The apparatus according to claim 2, wherein the display element includes a graphic element that illustrates the adjustment to the selected grind discharge as input by the user using the grind discharge amount adjustment selector.

4. The apparatus according to claim 2, wherein
   the display having depictions that represent a range of grinder functions.

5. The apparatus according to claim 4, the apparatus further including a sensor element coupled to the processor element for detecting presence of a container placed in the ground discharge region.

6. The apparatus according to claim 5, the apparatus further including a sensor element coupled to the processor element for detecting presence of a cradle placed in the ground discharge region.

7. The apparatus according to claim 4, wherein
   the ground discharge region is adapted to receive a container type selected from the set comprising: a portafilter, a filter or a storage canister.

8. The apparatus according to claim 4, wherein
   the ground discharge region is adapted to receive a cradle.

9. The apparatus according to claim 4, wherein
   the processor element can determine a container type placed in the ground discharge region, and adjust the display element accordingly.

10. The apparatus according to claim 4, wherein
    the processor element can determine presence of a cradle in the ground discharge region, and adjust the display element accordingly.

11. The apparatus according to claim 4, wherein
    the grinder mechanism is adjustable to provide fine control over grind size; and
    the display element being adapted to provide graphic user feedback with regard to grind size and ground discharge quantity.

12. The apparatus according to claim 4, wherein
    the processor element interrogates one or more look up table to determine the operating grind duration setting.

13. The apparatus according to claim 4, wherein
    grind quantity is displayed in 'shots' when an espresso grind size is selected or 'cups' when a percolator or filter grind size is selected.

14. The apparatus according to claim 13, wherein
    the grinder mechanism is a motorised burr grinder.

15. The apparatus according to claim 14, wherein
the motorised burr grinder includes a motor driven lower burr and an upper burr; and
an upper burr carriage being axially movable with respect of the lower burr for adjusting grind size.

16. The apparatus according to claim 15, wherein
a driven gear has an internal bore with fine threads that engage and cooperate with fine threads circumferentially located on the outside surface the upper burr carriage;
wherein the upper burr carriage is restrained from rotation and thus axially translates either up or down according to rotation of the driven gear, thereby moving the lower burr with respect to the upper burr for adjusting grind size.

17. The apparatus according to claim 16, wherein
the driven gear further comprises an external gear ring with radially oriented gear teeth for engaging a pinion gear that drives a multi-turn potentiometer for enabling the processor element to monitor degree of rotation of the pinion gear, which is translated into a visual indication on the display element.

18. The apparatus according to claim 11, the processor element receives a user selected dose adjustment data for fine-tuning dose quality.

19. The apparatus according to claim 18, the apparatus further including a hopper for feeding grounds to the grinder mechanism.

\* \* \* \* \*